United States Patent
Foster

(10) Patent No.: US 7,946,644 B1
(45) Date of Patent: May 24, 2011

(54) STING TRAILER

(75) Inventor: Robert Foster, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 231 days.

(21) Appl. No.: 12/169,398

(22) Filed: Jul. 8, 2008

(51) Int. Cl. *B61D 45/00* (2006.01)

(52) U.S. Cl. .................. 296/186.1; 296/24.43; 410/129

(58) Field of Classification Search .............. 296/24.4, 296/24.43, 146.8, 181.1, 181.7, 182.1, 186.1, 296/186.3; 410/118, 129
See application file for complete search history.

(56) References Cited

U.S. PATENT DOCUMENTS

| | | | | |
|---|---|---|---|---|
| 1,088,347 A * | 2/1914 | Koehler | ................. | 410/129 |
| 2,022,869 A * | 12/1935 | Reid | .............. | 296/182.1 |
| 2,185,209 A * | 1/1940 | Love | .............. | 296/24.37 |
| 2,561,098 A * | 7/1951 | Cole | .............. | 296/182.1 |
| 2,679,431 A * | 5/1954 | Wineman, Jr. | .......... | 296/182.1 |
| 3,103,379 A * | 9/1963 | Stone et al. | ........... | 296/182.1 |
| 3,405,778 A * | 10/1968 | Martin | .................. | 180/24 |
| 3,493,263 A * | 2/1970 | Brown | ............... | 296/186.1 |
| 3,961,323 A | 6/1976 | Hartkorn | | |
| 4,049,311 A * | 9/1977 | Dietrich et al. | .......... | 410/138 |
| 4,080,906 A * | 3/1978 | Brown | ................ | 410/130 |
| 4,498,824 A * | 2/1985 | Kinkle | ............... | 410/121 |
| 4,743,151 A * | 5/1988 | Haberkorn | ........... | 410/121 |
| 4,986,706 A * | 1/1991 | Williams, Jr. | ........... | 410/129 |
| 5,058,924 A * | 10/1991 | Whatley, Jr. | ............ | 280/837 |
| 5,346,233 A | 9/1994 | Moser | | |
| 5,418,038 A * | 5/1995 | Wise et al. | .............. | 428/192 |
| 5,472,300 A * | 12/1995 | Lipschitz | ............. | 410/139 |
| 5,577,522 A | 11/1996 | Barkley et al. | | |
| 5,628,541 A | 5/1997 | Gardner | | |
| 5,697,742 A * | 12/1997 | House | ................. | 410/127 |
| 5,735,639 A * | 4/1998 | Payne et al. | ........... | 405/129.57 |
| 5,791,726 A * | 8/1998 | Kaufman | ............. | 296/182.1 |
| 6,043,661 A | 3/2000 | Gutierrez | | |
| 6,139,091 A * | 10/2000 | Shultz | ................ | 296/182.1 |
| 6,259,475 B1 | 7/2001 | Ramachandran et al. | | |
| 6,793,271 B1 * | 9/2004 | Deets | ............... | 296/182.1 |
| 6,827,534 B2 | 12/2004 | Onken | | |
| 2005/0068417 A1 | 3/2005 | Kreiner et al. | | |
| 2008/0131226 A1 * | 6/2008 | Pesson | ............... | 410/129 |
| 2009/0174989 A1 * | 7/2009 | Nagel et al. | ........... | 361/679.01 |

FOREIGN PATENT DOCUMENTS

| | | | | |
|---|---|---|---|---|
| DE | 4314093 A1 | * | 1/1994 | |
| EP | 44746 A1 | * | 1/1982 | |
| EP | 146465 A2 | * | 6/1985 | |
| EP | 278558 A1 | * | 8/1988 | |
| FR | 2635737 A3 | * | 3/1990 | |
| WO | WO 8602605 A1 | * | 5/1986 | |

OTHER PUBLICATIONS

Foster, R., U.S. Appl. No. 12/169,445, filed Jul. 8, 2008, "Camera Installation for Trailer".
Foster, R., U. S. Appl. No. 12/169,422, filed Jul. 8, 2008, "Semi Trailer with External Switch".

* cited by examiner

*Primary Examiner* — Glenn Dayoan
*Assistant Examiner* — Paul A Chenevert
(74) *Attorney, Agent, or Firm* — Nixon & Vanderhye P.C.

(57) ABSTRACT

A sting trailer has a front end-wall located at a first standard trailer length from a rear end of the sting trailer, a false end-wall located at a second standard trailer length from the rear end of the sting trailer, and a hidden compartment located between the front end-wall and the false end-wall.

18 Claims, 3 Drawing Sheets

STING TRAILER

FIELD

The present disclosure relates generally to semi-trailer surveillance and, in particular, the present disclosure relates to sting trailers.

BACKGROUND

Cargo theft from cargo transportation containers, such as semi-trailers, is prevalent. Thefts can occur when a semi-trailer is left unattended, such as when the semi-trailer is parked at a rest-stop. Thefts may be perpetrated by employees of a receiver of the cargo as the employees unload the cargo. Thefts may also be perpetrated by the driver of the tractor that tows the semi-trailer.

To apprehend and prosecute thieves of cargo from semi-trailers, some semi-trailers are equipped with surveillance equipment, such as cameras, microphones, global positioning equipment, etc. Such semi-trailers are sometimes referred to as "sting trailers." The surveillance equipment typically transmits (e.g., wirelessly) signals to monitoring and recording equipment located a remote site, such as a surveillance vehicle. Monitoring and recording equipment may also be located on board the sting trailer as part of the surveillance equipment.

Sting trailers are designed to simulate an actual semi-trailer so as to avoid arousing the suspicion of would-be thieves. Therefore, surveillance equipment is usually hidden within the sting trailer. For example, monitoring and recording equipment, cameras, microphones, global positioning equipment, power supplies, etc. may be hidden in a hidden compartment located near the front of the sting trailer between a false end-wall and the actual front end-wall.

One problem with existing false end-walls is that they are typically located at a non-standard distance from the rear end of the sting trailer so that when viewed from the inside, the sting trailer appears to have a non-standard length, which can arouse suspicion. For example, semi-trailers typically have standard lengths, e.g., of 48 feet and 53 feet, and the false end-walls are located at 51 feet from the rear of the sting trailer such that the sting trailer appears to have a non-standard length of 51 feet when viewed from the inside. Moreover, some false end-walls have their own rivet joint that appears as an additional rivet joint from the inside and/or outside of the sting trailer, which can arouse suspicion.

Another problem with existing false end-walls is that they sometimes do not have the same structural characteristics as actual front end-walls, and knocking or tapping on the false end-wall can alert the knocker that the wall is in fact false. False end-walls are typically structurally inferior to actual front end-walls and are easily damaged, revealing that they are false.

Some sting trailers have solar panels located on the roof of the sting trailer for powering the surveillance system or for providing back-up power for the surveillance system. The solar panels are typically set back from the front and sides of the sting trailer to avoid detection from the ground outside of the sting trailer. However, some sting trailers have translucent roofs in order to simulate actual semi-trailers, and existing false end-walls are located too close to the front of the sting trailer so that the solar panels extend past the false end-wall, affording detection of the solar panels from inside the sting trailer.

For the reasons stated above, and for other reasons stated below which will become apparent to those skilled in the art upon reading and understanding the present specification, there is a need in the art for alternative false end-walls and alternative false-end-wall placement within sting trailers.

SUMMARY

One embodiment of the present invention provides a sting trailer having a front end-wall located at a first standard trailer length from a rear end of the sting trailer, a false end-wall located at a second standard trailer length from the rear end of the sting trailer, and a hidden compartment located between the front end-wall and the false end-wall.

DETAILED DESCRIPTION

Figure 1:
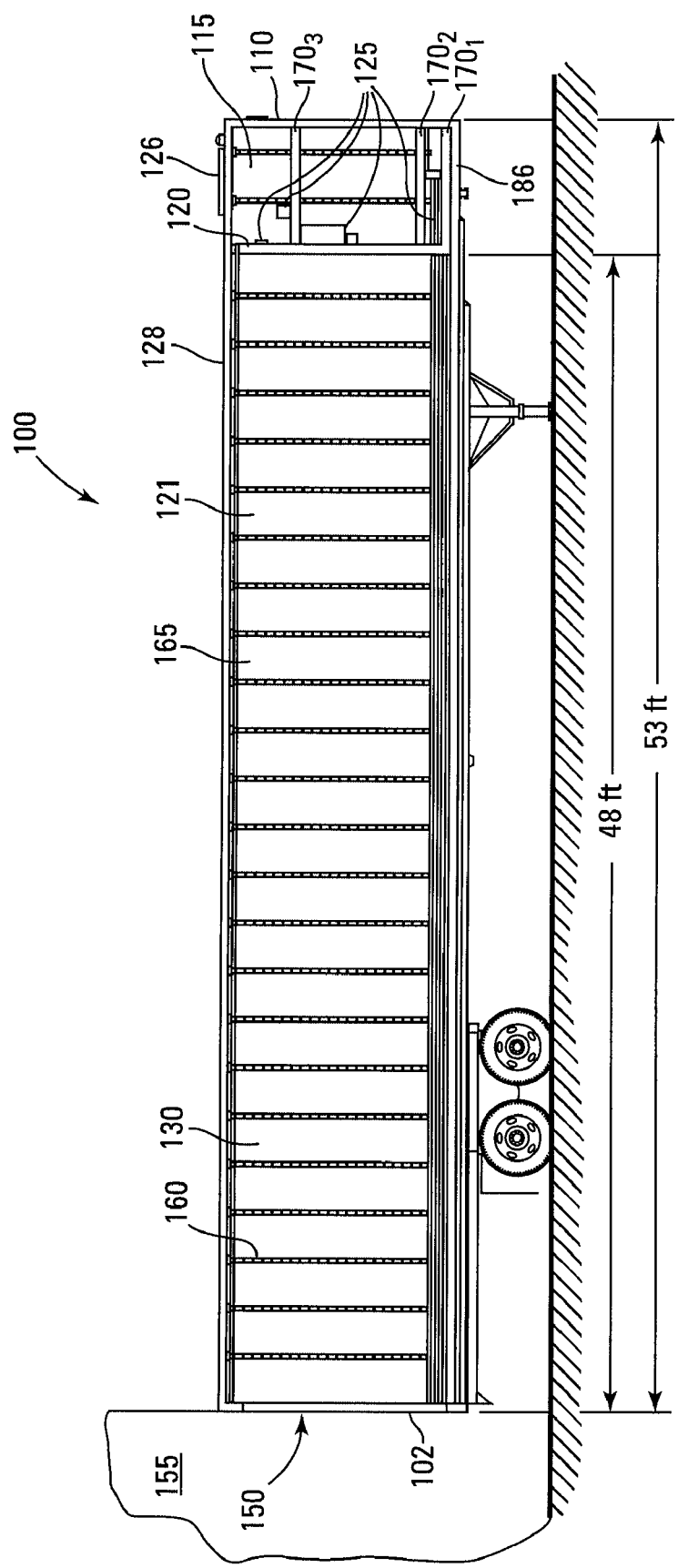
FIG. 1 is a side cutaway view of an embodiment of a sting trailer, according to an embodiment of the present invention.

In the following detailed description, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural changes may be made without departing from the scope of the present disclosure. The following detailed description is, therefore, not to be taken in a limiting sense, and the scope of the present disclosure is defined only by the appended claims and equivalents thereof.

FIG. 1 is a side cutaway view of a sting trailer 100, e.g., configured to operate as a semi-trailer, having a sidewall removed to reveal the interior of sting trailer 100. At its exterior, sting trailer 100 appears to be a conventional semi-trailer having a first standard trailer length, e.g., 53 feet, as its overall length. For example, a front end-wall 110 (e.g., sometimes called the nose of the trailer) is located at the first standard length from a rear end 102 of sting trailer 100.

Sting trailer 100 has a hidden compartment 115 located between front end-wall 110 and a false end-wall 120 and a cargo-carrying compartment 121 (FIGS. 1 and 2) located between false end-wall 120 and rear end 102. For one embodiment, hidden compartment 115 contains surveillance equipment 125, such as monitoring and recording equipment, cameras, microphones, global positioning equipment, power supplies, cabinets and enclosures for electrical equipment, access routers, rechargeable and/or non-rechargeable batteries, etc.

Figure 2:
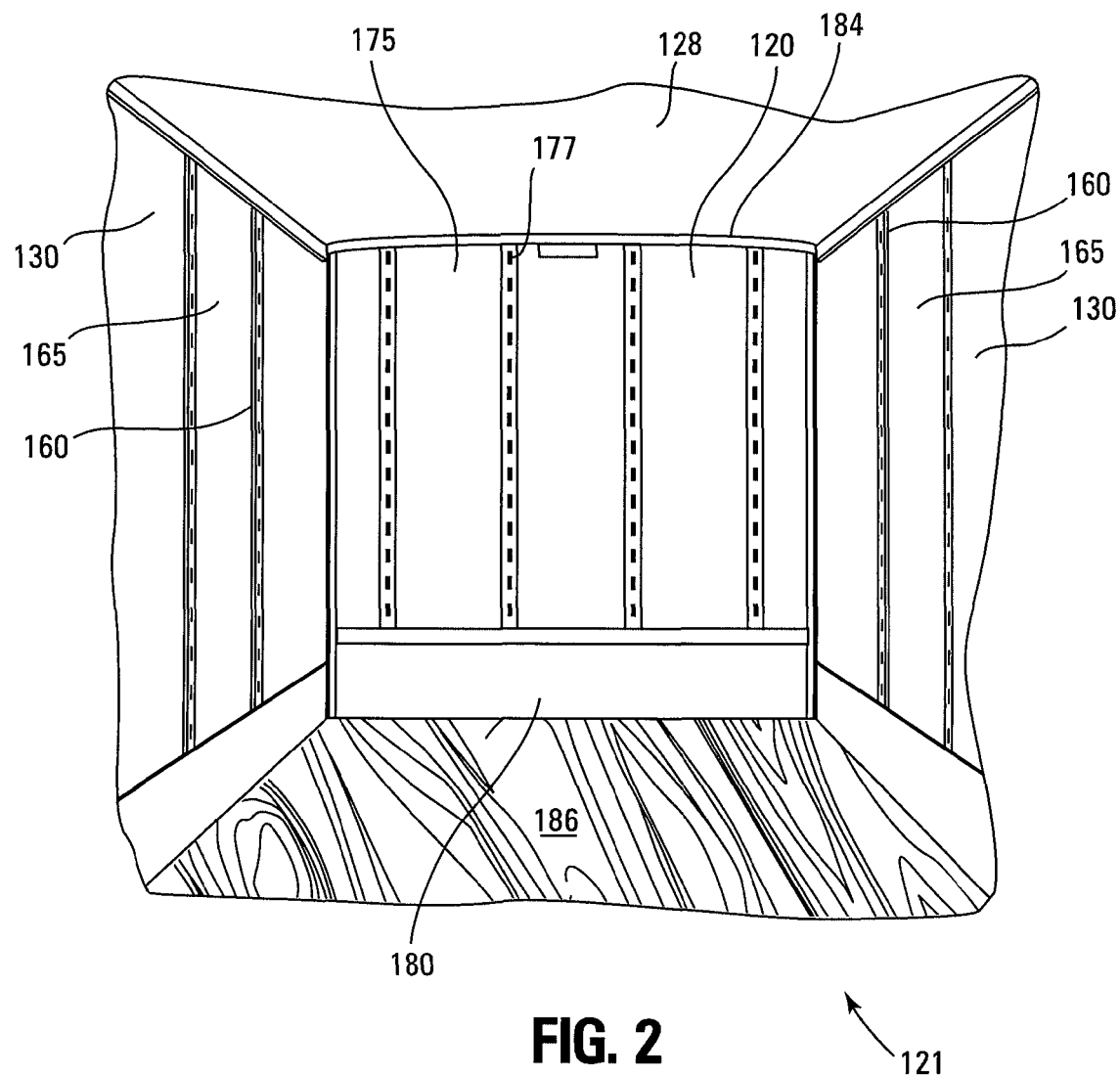
FIG. 2 is a view of an embodiment of a false end-wall from an interior of an embodiment of a sting trailer, according to another embodiment of the present invention.

For another embodiment, false end-wall 120 is located at a second standard trailer length, e.g., 48 feet, from rear end 102 so that when viewed through an opening 150 at rear end 102, as shown in FIG. 2, sting trailer 100 appears to have the length of a standard 48-foot semi-trailer. For example, the length between false end-wall 120 and rear end 102 is the same as the length between a front end-wall and a rear end of a conventional 48-foot semi-trailer, meaning that the cargo-carrying compartment 121 has the second standard length, e.g., that is the overall length of a standard 48-foot trailer. This means, for example, that sting trailer 100 appears to be a standard 53-foot semi-trailer at its exterior and appears to be a standard 48-foot semi-trailer at its interior. For example, the exterior of sting trailer 100 has the exterior length of a first conventional semi-trailer, e.g., a 53-foot semi-trailer, and the cargo-carrying compartment 121 has the length of a second conventional semi-trailer, e.g., 48 feet.

For one embodiment, solar panels 126 are located on an exterior of a roof 128 of sting trailer 100, as shown in FIG. 1. Solar panels 126 may be used to power the surveillance equipment 125, to provide back-up power to surveillance equipment 125, and/or to recharge rechargeable batteries of surveillance equipment 125 and are thus electrically coupled to surveillance equipment 125. Solar panels 126 directly overlie hidden compartment 115 and are located between front end-wall 110 and false end-wall 120. For example, solar panels 126 are set back from front end-wall 110 and sidewalls 130 (FIG. 1) of sting trailer 100 to avoid detection from the ground outside of sting trailer 100. Solar panels 126 are set back from false end-wall 120 so that hidden compartment 115 extends past solar panels 126, as shown in FIG. 1, to avoid detection from the interior of sting trailer 100, e.g., when roof 128 is translucent.

When cargo is loaded into sting trailer 100 or unloaded from sting trailer 100, sting trailer 100 may be positioned so that opening 150 coincides with a doorway in a loading dock 155, e.g., of a shipper or receiver of cargo of sting trailer 100, as shown in FIG. 1. With sting trailer 100 so positioned, workers and/or thieves who have access to the interior of sting trailer 100 via the doorway in loading dock 155 typically do not have access to the exterior of sting trailer 100. This means that sting trailer 100 has the second standard length, e.g., 48 feet, when viewed interiorly, e.g., via the doorway in loading dock 155, by workers and/or would-be thieves at the loading dock. Moreover, as part of a sting operation, workers who only have access to the interior of sting trailer 100 may be provided with documentation that indicates that sting trailer 100 has the second standard length.

To thieves who have access to the interior and exterior of sting trailer 100, sting trailer 100 has the first standard length when viewed from the exterior. Cargo typically conceals the false end-wall 120 when the thieves access the interior of a sting trailer 100, thereby preventing the thieves from observing that interior and exterior lengths of sting trailer 100 are different, which can arouse suspicion. Moreover, thieves typically do not spend sufficient time to unload enough cargo to reveal the front end-wall or the false wall in place of the front end-wall for fear of getting caught. Therefore, thieves are usually unable to determine whether interior and exterior lengths are different. Moreover, thieves are often apprehended by sting operations before unloading enough cargo to reveal a false end-wall.

As shown in FIGS. 1 and 2, joints 160, e.g., of metal, may be located between panels 165, e.g., of plywood, of sidewalls 130. Joints 160 are observable from the interior of cargo-carrying compartment 121 and are located at increments, e.g., of two feet, along the length of sidewalls 130 and thus along the length of the interior of cargo-carrying compartment 121. For one embodiment, joints 160 may be riveted to panels 165 so that joints 160 coincide with rivet lines (not shown) on the exterior of sidewalls 130. For example, sidewalls 130 may include metal sheets (not shown) that cover panels 165 to form the exterior of sidewalls 130, and the rivet lines are on an exterior surface of these sheets and are thus observable from the exterior of trailer 100.

For another embodiment, false end-wall 120 coincides with an existing (e.g., even-numbered) joint 160, such as the 24$^{th}$ joint from end 102. This joint 160 is located after a standard (e.g., even) number of increments (e.g., such as 24) that corresponds to the second standard length (e.g., 48 feet) from the rear end 102 of sting trailer 100. This is because thieves and workers who are familiar with semi-trailers are aware of how many increments and joints are located between the end of a standard semi-trailer and the front end-wall and would be suspicious if the front end-wall was not at a standard number of increments, e.g., 24 for a standard 48-foot trailer, from the rear of the trailer.

For one embodiment, false end-wall 120 is added to a conventional 53-foot semi-trailer as part of converting the conventional semi-trailer into sting trailer 100. During the conversion, false end-wall 120 is aligned with a preexisting joint 160, and thus a preexisting exterior rivet line, that was formed at 48 feet from the rear end of the conventional 53-foot semi-trailer during the manufacture of the conventional 53-foot semi-trailer.

Some existing conventional sting trailers have a false end-wall located at a non-standard length from the rear end, e.g., 51 feet, so that the false end-wall is centered between successive joints, e.g., between the 25$^{th}$ and 26$^{th}$ joints, at a non-standard number of increments, e.g., 25½ increments, from the rear end of the conventional sting trailer. This can arouse the suspicion of workers and thieves familiar with trailers in that the front end-wall for a standard 48-foot trailer is typically located at 24 increments from the rear end of the trailer, and the front end-wall for a standard 53-foot trailer is typically located at 26½ increments from the rear end of the trailer. Moreover, the false end-walls located at 51 feet from the rear of these trailers often have their own rivet lines on the exterior of the sidewalls located between preexisting rivet lines, which can further arouse the suspicion of workers and thieves familiar with trailers.

For one embodiment, braces 170, e.g., of wood or metal, are interposed between false end-wall 120 and front end-wall 110, as shown in FIG. 1. For example, brace 170$_1$ may be located adjacent to or against a floor 186 of sting trailer 100, and braces 170$_2$ and 170$_3$ may be respectively located at different distances above brace 170$_1$, as shown in FIG. 1. For an alternative embodiment, brace 170$_3$ may be positioned against roof 128, and brace 170$_2$ may be moved to the previous location of brace 170$_3$, e.g., at about six feet above floor 186. Braces 170 act to reinforce false end-wall 120 and act to prevent movement of false end-wall 120 in a direction toward front end-wall 110, e.g., when collisions occur between equipment used to load and/or unload cargo, such as forklifts, and false end-wall 120. For example, some conventional false end-walls of existing conventional sting trailers have been knocked out of place by forklifts, affording immediate detection of the hidden compartment behind the false end-wall.

As shown in FIGS. 1 and 2, joints 160, e.g., of metal, may be located between panels 165, e.g., of plywood, of sidewalls 130. Joints 160 are observable from the interior of cargo-carrying compartment 121 and are located at increments, e.g., of two feet, along the length of sidewalls 130 and thus along the length of the interior of cargo-carrying compartment 121.

As shown in FIG. 2, the surface of false end-wall 120 matches the interior surfaces of sidewalls 130. For example, joints 177, e.g., of metal, may be located between panels 175, e.g., of plywood, of false end-wall 120. Joints 177 are observable from the interior of cargo-carrying compartment 121 and have increments between joints 177, where the increments between joints 177 are the same length, e.g., about two feet, as the increments between joints 160 of sidewalls 130. The joints 177 of false end-wall 120 have the same pattern as the joints 160 of sidewalls 130. For one embodiment, false end-wall 120 has a base 180 and a header 184, as shown in FIG. 2.

Figure 3:
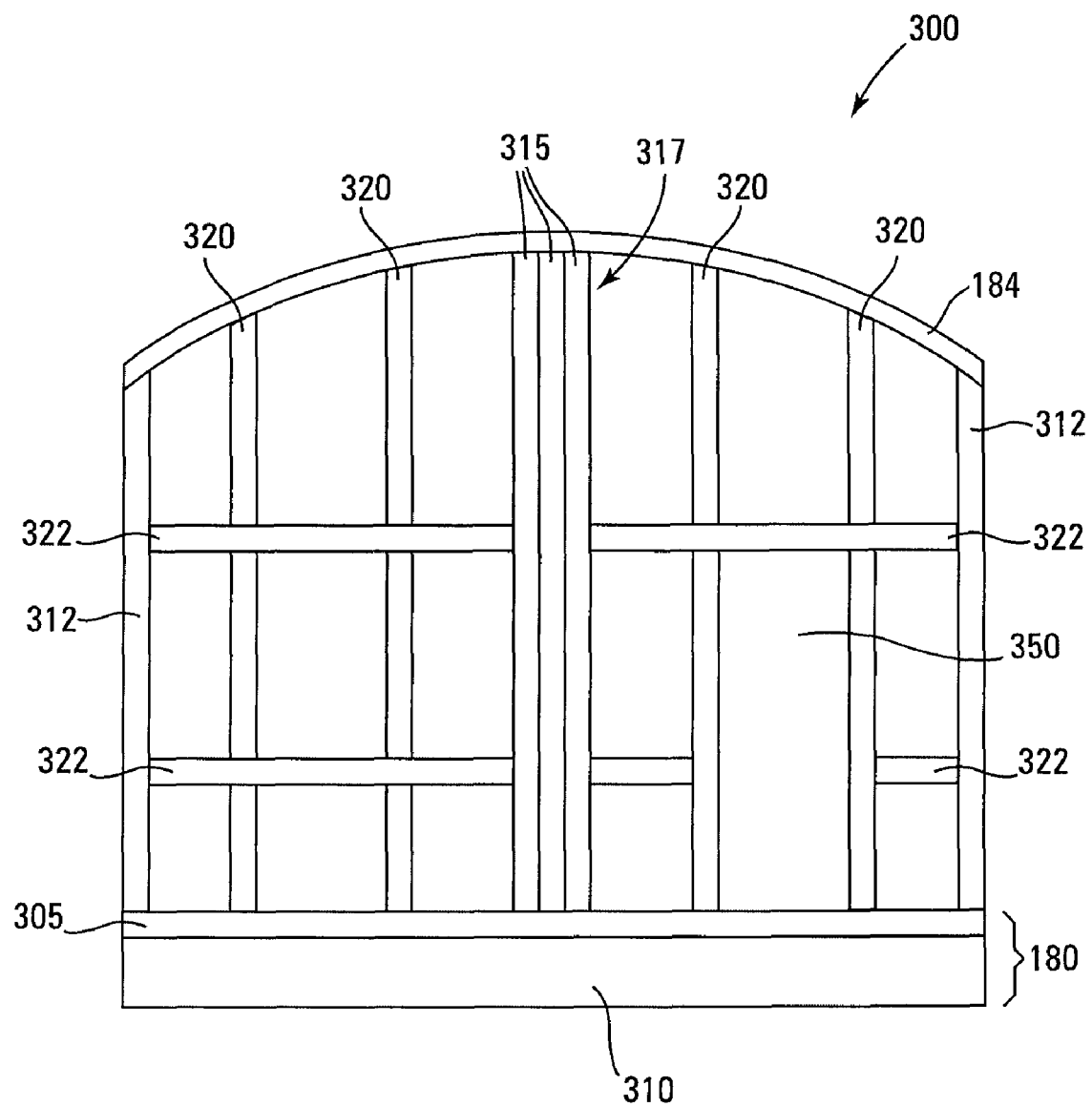
FIG. 3 illustrates an embodiment of a frame of a false end-wall of an embodiment of a sting trailer, according to another embodiment of the present invention.

FIG. 3 illustrates a frame 300 of false end-wall 120, according to another embodiment. For one embodiment, frame 300 includes base 180 and header 184, and panels 175 overlie frame 300 between the base 180 and the header 184. For another embodiment, header 184, e.g., a wooden "2×4" (1.5 in. by 3.5 in.), may be bowed to match a curvature of roof 128 of sting trailer 100, and base 180 may include a beam 305, e.g. a wooden "2×4" (1.5 in. by 3.5 in.), connected to a beam 310, e.g., a wooden "2×6" (1.5 in. by 5.5 in.). Header 184 is fixed to roof 128 of sting trailer 100 and base 180 is fixed to floor 186 (FIG. 2) of sting trailer 100. Braces 170 (FIG. 1) may be connected to frame 300 in one embodiment.

Studs 312, e.g., wooden "2×4s," are interposed substantially vertically between beam 305 and header 184 and are connected thereto to form the sides of frame 300 that are fixed to sidewalls 130 (FIG. 2) of sting trailer 100. For another embodiment, one or more studs 315, e.g., wooden "2×4s," that are stacked side by side and connected together are disposed substantially vertically between beam 305 and header 184 and are connected thereto to form a central support column 317 interposed between beam 305 and header 184. For another embodiment, studs 320, e.g., wooden "2×4s," are disposed substantially vertically between beam 305 and header 184 and connected thereto to provide additional vertical support. In another embodiment, braces 322, e.g., wooden "2×4s," may be connected between the side studs 312 and central vertical support 317. Braces 322 may be lateral braces that are substantially perpendicular to side studs 312 and central vertical support 317, as shown in FIG. 3. Alternatively, braces 322 may be angled with respect to side studs 312 and central vertical support 317.

For another embodiment, a portion (e.g., a center portion) of at least one of the braces 322 may be removed, as shown in FIG. 3, to provide an opening 350, such as a passageway, through false end-wall 120. Opening 350 provides access to hidden compartment 115 (FIG. 1) and enables a person to pass from the cargo-carrying compartment 121 on one side of false end-wall 120 to hidden compartment 115 on the other side of false end-wall 120.

Frame 300 acts to improve the structural integrity of false end-wall 120 so that false end-wall 120 is less likely to be damaged in the event a forklift or other loading and unloading equipment collides with false end-wall 120. Moreover, braces 170 (FIG. 1) and frame 300 enable false end-wall 120 to distribute and absorb vibrations, e.g., induced by knocking upon false end-wall 120, in a manner similar to front end-wall 110, making it more difficult to detect the false nature of false end-wall 120 by knocking upon false end-wall 120. For example, the false nature of some existing conventional false end-walls of existing conventional sting trailers has been detected by merely knocking on the false end-wall.

CONCLUSION

Although specific embodiments have been illustrated and described herein it is manifestly intended that the scope of the claimed subject matter be limited only by the following claims and equivalents thereof.

What is claimed is:

1. A sting trailer, comprising:
sidewalls including vertical joints spaced a standard distance and observable from an interior of the trailer;
a front end-wall located at a first standard trailer length from a rear end of the sting trailer;
a false end-wall located at a second standard trailer length from the rear end of the sting trailer, wherein the false end-wall includes vertical joints spaced by the standard distance of the sidewalls and observable from the interior of the trailer;
one or more braces interposed between the front end-wall and the false end-wall; and
a hidden compartment located between the front end-wall and the false end-wall.

2. The sting trailer of claim 1, further comprising solar panels disposed on a roof of the sting trailer so that the solar panels overlie the hidden compartment and are located between the front end-wall and the false end-wall.

3. The sting trailer of claim 1, wherein the first standard trailer length is 53 feet and the second standard trailer length is 48 feet.

4. The sting trailer of claim 1,
wherein the false end-wall comprises panels overlying a frame that is fixed to the trailer.

5. The sting trailer of claim 4, wherein the frame comprises:
a header fixed to a roof of the sting trailer;
a base fixed to a floor of the sting trailer; and
sides connected to the header and the base and fixed to the sidewalls of the sting trailer.

6. The sting trailer of claim 5, wherein the frame further comprises a central support column connected between the header and the base.

7. The sting trailer of claim 6, wherein the frame further comprises one or more studs located on either side of the central support column and connected between the header and base.

8. The sting trailer of claim 7, wherein the frame further comprises one or more braces located on either side of the central support column and connected between the sides and the central support column.

9. A sting trailer, comprising:
sidewalls including vertical joints spaced a standard distance and observable from an interior of the trailer;
a hidden compartment containing surveillance equipment;
a cargo-carrying compartment;
a false end-wall interposed between the hidden compartment and the cargo-carrying compartment, the hidden compartment being disposed between the false end-wall and a front end-wall, wherein the false end-wall includes vertical joints spaced by the standard distance of the sidewalls and observable from the interior of the trailer; and
one or more braces interposed between the front end-wall and the false end-wall,
wherein an exterior length of the sting trailer is an overall length of a first standard semi-trailer and a length of the cargo carrying compartment is an overall length of a second standard semi-trailer, the overall length of the first standard semi-trailer being different than the overall length of the second standard semi-trailer.

10. The sting trailer of claim 9, wherein the overall length of the first standard semitrailer is 53 feet and the overall length of the second standard semi-trailer is 48 feet.

11. The sting trailer of claim 9, wherein the false end-wall coincides with an even-numbered one of the vertical joints in each of the sidewalls of the sting trailer.

12. The sting trailer of claim 9, further comprising solar panels disposed on a roof of the sting trailer and directly overlying the hidden compartment.

13. The sting trailer of claim 12, wherein the solar panels are configured to supply power to the surveillance equipment.

14. A method of constructing a sting trailer, comprising:
providing a semi-trailer having a front end-wall located at a first standard semi-trailer length from a rear end of the semi-trailer and sidewalls including vertical joints spaced a standard distance and observable from an interior of the semi-trailer;
forming a false end-wall in the interior of the provided semi-trailer between the front end-wall and the rear end at a second standard semi-trailer length from the rear end to form a hidden compartment between the front end-wall and the false end-wall, wherein forming the false end-wall further comprises providing vertical joints spaced by the standard distance of the sidewalls and interposing one or more braces between the false end-wall and the front end-wall of the provided semi-trailer, the spaced vertical joints of the false end-wall being observable from the interior of the semi-trailer; and
disposing surveillance equipment in the hidden compartment.

15. The method of claim 14, further comprising disposing solar panels on a roof of the provided semi-trailer directly overlying the hidden compartment for supplying power to the surveillance equipment.

16. The method of claim 14,
wherein forming the false end-wall further comprises disposing panels on a frame and securing the frame to the interior of the provided semi-trailer.

17. The method of claim 14, wherein forming the false end-wall further comprises aligning the false end-wall with an existing one of the vertical joints in each of the sidewalls of the provided semi-trailer.

18. The method of claim 17, wherein the existing joint is an even-numbered joint.

\* \* \* \* \*